March 27, 1951     J. W. GRIFFITH     2,546,858
PNEUMATIC TIRE CASING
Filed Oct. 20, 1948

*INVENTOR.*
John W. Griffith.
BY
*James K. Ely*

Patented Mar. 27, 1951

2,546,858

UNITED STATES PATENT OFFICE 2,546,858

PNEUMATIC TIRE CASING

John W. Griffith, Pittsburgh, Pa.

Application October 20, 1948, Serial No. 55,530

7 Claims. (Cl. 152—198)

1

This invention relates to pneumatic tire casings and in particular to reinforced pneumatic tire casings having puncture resisting characteristics.

The use of metallic reinforcements in tires has been suggested before. In such cases the metallic inserts such as wire, cable and the like have been employed primarily to reinforce the casing as opposed to rendering the tire substantially puncture proof.

An object of this invention is to provide a pneumatic tire casing having a substantially continuous sheath of metal embedded therein in predetermined relation with respect to the tread and side wall portions to impart thereto substantially puncture proof characteristics.

Another object of this invention is the provision in a pneumatic tire casing of a substantially continuous resilient metallic sheath for reinforcing the casing and imparting puncture proof characteristics thereto.

A further object of this invention is the provision of a pneumatic tire casing having a plurality of spaced resilient sheaths of metal embedded therein to render the tread and parts of the side wall portions thereof substantially puncture proof.

Other objects of this invention will become apparent from the following description when taken in conjunction with the accompanying drawing, in which.

Figure 1:
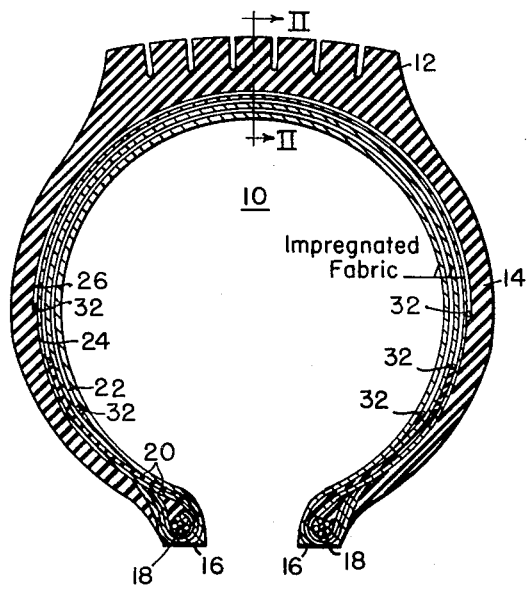
Figure 1 is a view in vertical section of a pneumatic tire casing embodying the teachings of this invention.

Referring to Figure 1, there is illustrated a tire casing 10 having a tread portion 12, side wall portions 14 and bead portions 16. The outer surface or portion of the casing 10 is of rubber as in usual practice and the bead portions 16 are provided with the usual bead wires or cables 18.

In this embodiment the internal portion of the casing 10 is formed of layers 20 of fabric, such as canvas or duck, impregnated with rubber which extend around the casing and are wrapped around the bead wires 18 and three layers 22, 24 and 26 of wire 28 disposed in predetermined relation with respect to the layers 20 and the tread and side wall portions.

Figure 5:
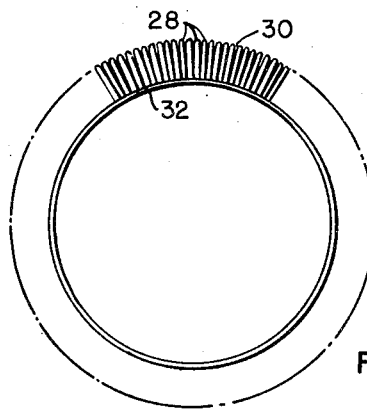
Figure 5 is a plan view of a resilient sheath, the wires thereof being greatly exaggerated in thickness, to be utilized in the embodiments of Figures 1 and 3.
Figure 6:
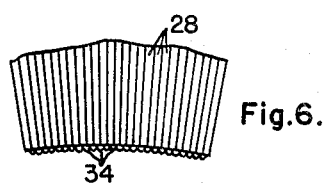
Figure 6 is a fragmentary plan view of another embodiment of the sheath utilized in the casings of this invention.

As shown in Figures 5 and 6 each of the layers 22, 24 and 26 comprises a plurality of individual wires 28 disposed closely adjacent and in side by side relation to one another in substantially parallel planes which extend radially from a common point whereby when assembled in the casing 10 the wires 28 extend throughout the tread portion 12 and a part of the side wall portions 14. As illustrated in Figure 5, although greatly exaggerated therein, the ends of the adjacent wires 28 are in substantial contact engagement while the central portions of the wires are slightly spaced by reason of the radial positioning of the wires to form a circular member, the cross section of which is of substantially the cross sectional shape of the tread and part of the side walls of the carcass of the casing.

The wires 28 are preferably of resilient hard drawn spring steel with a thin coating of copper (not illustrated) thereon and have a gauge or diameter of .037 inch and a tensile strength of not less than 200,000 pounds per square inch. As referred to hereinbefore, the adjacent wires 28 being in substantially parallel planes radially disposed have fine interstices or spacings 30 therebetween, such interstices being greatly exaggerated in the drawing. Preferably the interstices 30 are infinitesimal, being of the order of 0.001 to 0.005 inch whereby the assembled wires 28 forming each of the layers 22, 24 and 26 comprise substantially continuous sheaths of metal.

In order to maintain the individual wires 28 in assembled relation relative to one another, a pair of wires 32 (shown in Figure 1) of predetermined circular shape and size to seat against the opposite ends of the assembled wires 28 as shown in Figure 5, are secured to the opposite ends of the wires 28 as by welding or soldering. As will be appreciated, the wires 28 can be assembled in a suitable jig or form until secured in assembled position relative to one another by securing the opposite ends of the wires 28 to the circular shaped wires 32 to maintain the individual wires 28 adjacent to one another. Preferably the individual wires 28 are preformed to the required shape to correspond to the curvature which is to be normally maintained in the casing 10 as shown in Figure 1.

Instead of maintaining the wires 28 in assembled relation as by means of the pair of wires 32, the ends of the adjacent wires 28 may be secured together as shown in Fig. 6 by means of small beads 34 of solder or tack weld metal at each of the opposite ends of the individual wires. In practice, uniform beads 34 can be readily formed whereby the resulting layer or sheath will have proper balance.

As illustrated in Figure 1, the individual wires 28 of the layers 22, 24 and 26 are of different length whereby when assembled alternately with the layers 20 of impregnated fabric, the layers 22, 24 and 26 extend across the tread portion 12 and part of the side wall portions 14, terminating in the opposite side walls in stepped relation with the number of layers of wire 28 progressively diminishing in the direction towards the bead portions 16. The layers 20 of fabric and layers 22, 24 and 26 of wire may be assembled by superimposing the layers in their alternate relation upon a suitable mold form or core and either partially vulcanizing the assembled layers and thereafter assembling the partially vulcanized assembly in a suitable mold with the rubber forming the outer portion or surface of the casing 10 and then completing the vulcanization, or the assembled layers and rubber may be vulcanized into an integral unit in one step.

Upon examination, it is found that the rubber of the layers 20 and of the outer portion or surface of the casing 10 penetrates and fills the infinitesimal spaces 30 between the adjacent wires 28 of the layers 22, 24 and 26 and is securely bonded to the copper coated surface of the wires 28. The flash of copper on the steel wire facilitates the bonding of the rubber to the wire.

Figure 2:
Figure 2 is an exaggerated view in section of a portion of the casing taken along the line II—II of Figure 1.
Figure 3:
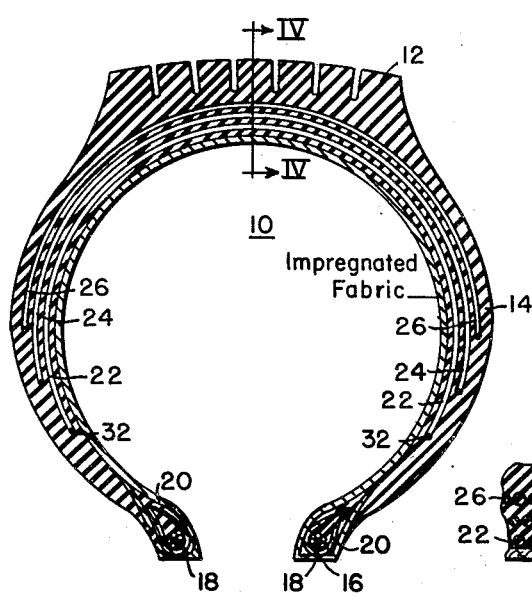
Figure 3 is a view in vertical section of a pneumatic tire casing illustrating another embodiment of this invention.
Figure 4:
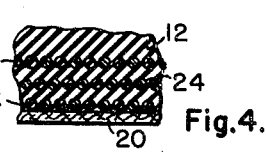
Figure 4 is an exaggerated view in section of a portion of the casing taken along the line IV—IV of Figure 3.

In the embodiment illustrated in Figs. 3 and 4, only one layer 20 of fabric impregnated with rubber is employed to form the internal surface of the casing 10. In this instance the layers 22, 24 and 26 of wire are spaced by suitable layers of rubber therebetween, the layers of wire providing the strengthening factor as well as imparting puncture proof characteristics to the casing 10. As in the embodiment of Figs. 1 and 2, the layers 22, 24 and 26 terminate in the opposite side wall portions 14 in stepped relation and progressively diminish towards the bead portions 16 whereby the layers of wire are independent of the bead portions 16. The rubber is securely bonded to the individual copper coated wires 28 forming the layers 22, 24 and 26 and fills the infinitesimal openings between the wires.

In both embodiments, the layers 22, 24 and 26 of wire form spaced resilient sheaths of substantially continuous metal across the tread portion 12 and parts of the side wall portions 14. Since the interstices 30 between the adjacent wires 28 of each layer are infinitesimal, it will be appreciated that it will be extremely difficult for a nail or the like to penetrate through the casing 10, especially through the tread portion 12 or the parts of the side wall portions 14 adjacent the tread portion which in practice are most commonly punctured and which in the case of the tire casing of this invention are protected by the embedded spaced layers of wire. This is especially true if the layers 22, 24 and 26 are so positioned that the spaces 30 of the outermost layer is aligned with the wires 28 of the next layer so that in effect the infinitesimal spaces of adjacent layers of wire are staggered.

Since the wires 28 and consequently the resulting layers or sheaths formed therefrom are resilient, the presence of the spaced sheaths in the casing does not detract from the resiliency of the casing. Further, the wires 28 aid in the dissipation of heat developed in the tread of the tire during use whereby the life of the rubber in the casing is lengthened.

Although the embodiments illustrated in Figures 1 and 3 utilize three of the spaced layers of wire, it is to be understood that such number may be increased depending upon the size of the tire. In all cases, however, the metallic sheaths should terminate in stepped relation in the opposite side walls as described in order that the resulting casing will not be too stiff adjacent the bead portions and also to maintain the weight of the tire at a minimum. Whether the tire casing embodies a number of layers of the fabric or only one will depend upon design considerations of the strength or stiffness required of the side walls adjacent the bead portions and not upon the strength considerations in the tread portion as the layers of wire provide adequate strength therein.

The tire casing of this invention is substantially puncture proof, a characteristic desired in tires for years. Such characteristic is obtained without detracting from the general resiliency of the casing or greatly adding to the cost thereof. Further, the casing is constructed of standard components and can be readily reproduced.

I claim as my invention:

1. A pneumatic tire casing comprising, in combination, a rubber carcass having tread, sidewall and bead portions, a plurality of layers of wire disposed in the carcass in spaced relation to each other, each of the layers of wire comprising a plurality of individual wires disposed adjacent to one another radially extending in substantially parallel planes with the opposite ends of each of the wires terminating in the opposite side walls of the carcass thereby forming a sheath of metal extending about the carcass in embedded relation therein, and means securing the adjacent ends of said individual wires one to another for maintaining the wires in said substantially parallel planes within the carcass.

2. A pneumatic tire casing comprising, in combination, a rubber carcass having tread, sidewall and bead portions, a plurality of layers of resilient wire disposed in the carcass in spaced relation to each other, each of the layers of wire comprising a plurality of individual wires disposed adjacent to one another in radially extending substantially parallel planes with the opposite ends of each of the wires terminating in the opposite side walls of the carcass thereby forming a resilient sheath of metal extending about the tread portion in embedded relation therein, and means securing the adjacent ends of said individual wires one to another for maintaining the adjacent wires in said substantially parallel planes within the carcass.

3. A pneumatic tire casing comprising, in combination, a rubber carcass having tread, sidewall and bead portions, a plurality of layers of wire disposed in the carcass in spaced relation to each other, each of the layers of wire comprising a plurality of individual wires disposed adjacent to one another in radially extending substantially parallel planes with the opposite ends of each of the wires terminating in the opposite side walls of the carcass thereby forming a sheath of metal extending about the carcass in embedded relation therein, and means securing the adjacent ends of said individual wires one to another for maintaining the wires in said substantially parallel planes within the carcass, said spaced layers having the ends of the wires forming the sheaths terminating in the side wall portions in spaced stepped relation whereby the tread portion and a part of the side wall portions embody a plurality of the spaced sheaths with the number of sheaths progressively decreasing in the side wall portions toward the bead portions.

4. A pneumatic tire casing comprising, in combination, a rubber carcass having tread, sidewall and bead portions, a plurality of layers of resilient wire disposed in the carcass in spaced relation to each other, each of the layers of wire comprising a plurality of individual wires disposed adjacent to one another in radially extending substantially parallel planes with the opposite ends of each of the wires terminating in the opposite side wall portions of the carcass thereby forming a resilient sheath of metal extending about the carcass in embedded relation therein, means securing the adjacent ends of said wires one to another for maintaining the wires in said substantially parallel planes, the adjacent wires in the tread portion having fine interstices therebetween filled with the rubber of the carcass whereby the rubber envelops the wires, said rubber being bonded to said wires.

5. A pneumatic tire casing comprising, in combination, a rubber carcass having tread, sidewall and bead portions, a plurality of layers of resilient wire disposed in the carcass in spaced relation to each other, each of the layers of wire comprising a plurality of individual wires disposed adjacent to one another in radially extending substantially parallel planes with the opposite ends of each of the wires terminating in the opposite side wall portions of the carcass thereby forming a substantially continuous resilient sheath of metal extending about the carcass in embedded relation therein, means securing the adjacent ends of said wires together for maintaining the wires in said parallel planes, the spaced layers having the ends of the wires forming the sheaths terminating in the side wall portions in spaced stepped relation whereby the tread portion and a part of the side wall portions include a plurality of the spaced sheaths with the number of the sheaths progressively decreasing in the side wall portions toward the bead portions.

6. A pneumatic tire casing comprising, in combination, a rubber carcass having tread, sidewall and bead portions, the rubber carcass including a plurality of alternate layers of rubber and layers of resilient wire, each of the layers of wire comprising a plurality of individual wires disposed adjacent to one another in radially extending substantially parallel planes with the opposite ends of each of the wires terminating in the opposite side wall portions of the carcass thereby forming a substantially continuous resilient sheath of metal extending through the tread and part of the side wall portions of the carcass in embedded relation therein, means securing the adjacent ends of said wires together for maintaining the wires in said substantially parallel planes, the spaced layers of wire having the ends thereof terminating in the side wall portions in spaced stepped relation independent of the bead portions, the alternate layers of rubber and layers of resilient wire being bonded together into an integral unit.

7. A pneumatic tire casing comprising, in combination, a rubber carcass having tread, sidewall and bead portions, the rubber carcass including a plurality of alternate layers of fabric impregnated with rubber and layers of resilient wire, each of the layers of wire comprising a plurality of individual wires disposed adjacent to one another in radially extending substantially parallel planes with the opposite ends of each of the wires terminating in the opposite side wall portions thereby forming a substantially continuous resilient sheath of metal extending through the tread and part of the side wall portions of the carcass, means securing the adjacent ends of said wires together for maintaining the wires in said substantially parallel planes, the spaced layers of wire having the ends thereof terminating in the side wall portions in spaced stepped relation with the layers of wire progressively decreasing in the direction of the bead portions, the rubber of the fabric layers bonding the adjacent layers of wire therebetween.

JOHN W. GRIFFITH.

REFERENCES CITED

The following references are of record in the file of this patent:

UNITED STATES PATENTS

| Number | Name | Date |
| --- | --- | --- |
| 941,871 | Gautlier | Nov. 30, 1909 |
| 952,072 | English et al. | Mar. 15, 1910 |
| 961,443 | Herman | June 14, 1910 |
| 1,288,960 | Mix | Dec. 24, 1918 |